M. O. SMITH.
INSULATED AND PROTECTED GRID.
APPLICATION FILED APR. 16, 1920.
1,364,011.
Patented Dec. 28, 1920.
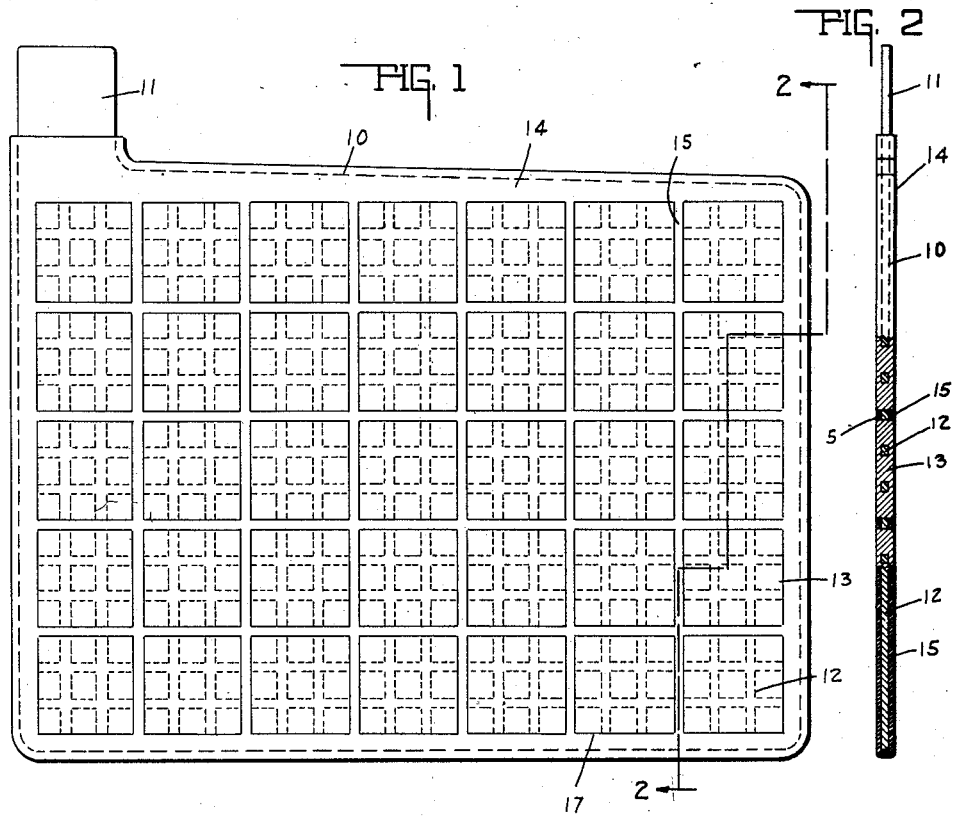
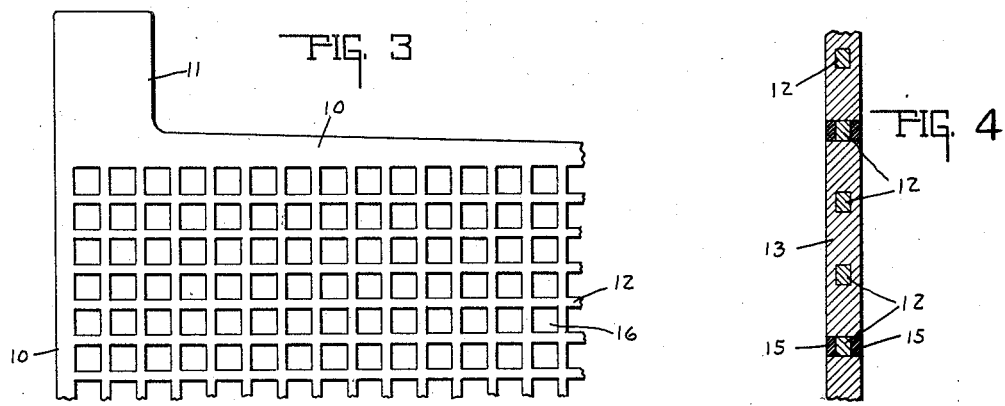
MALCOM O. SMITH, INVENTOR.
BY
ATTORNEYS.

UNITED STATES PATENT OFFICE.

MALCOM O. SMITH, OF INDIANAPOLIS, INDIANA.

INSULATED AND PROTECTED GRID.

1,364,011.  Specification of Letters Patent.  Patented Dec. 28, 1920.

Application filed April 16, 1920. Serial No. 374,383.

*To all whom it may concern:*

Be it known that I, MALCOM O. SMITH, a citizen of the United States, and a resident of Indianapolis, county of Marion, and State of Indiana, have invented certain new and useful Insulated and Protected Grids; and I do hereby declare that the following is a full, clear, and exact description thereof, reference being had to the accompanying drawings, in which like numerals refer to like parts.

This invention relates to storage batteries, and in particular to the grid plate thereof which is adapted to contain "paste" or the active material of the battery, said grid plate being suitably supported and suspended within said battery and the electrolyte, usually sulfuric acid, contained within the battery casing.

The chief object of this invention is to prevent the local action thereof, the same resulting from the exposure of the lead alloy forming the framework of the grid plate to the action of the sulfuric acid surrounding the same.

The main feature of the invention is in covering the lead alloy surrounding frame of the grid with a thin layer of non-conducting material, and preferably an inactive material, such as glass, celluloid or hard rubber, the composition thereof being selected chiefly for its non-conducting electrical powers and its resistance to the action of the acidic electrolyte. When the grid alloy frame is thus covered, the same makes it necessary for the electric current generated within the battery to pass through the active material or paste before it finds a conductor through which it can complete the circuit.

Another feature of the invention consists in first forming the grid plate, and then of forming upon the same and securing thereto the inclosing and protecting insulating cover material.

A further feature of the invention is the provision of spaced supporting strips or threads, which in addition to protecting the faces of said grid from actual injury, also permit the depth of the active material secured to said grid to be substantially increased to the additional depth of the adjacent protecting strip.

A further feature of the invention consists in so positioning the protecting strips with relation to the strips forming the honeycomb portion of the lead alloy grid so that the same coincide, whereby increased physical strength is secured in the grid.

The full nature of the invention will be understood from the accompanying drawings and the following description and claims.

In the drawings Figure 1 is a side view of a storage battery grid plate embodying the features of the invention. Fig. 2 is a vertical sectional view taken on the broken line 2—2 of Fig. 1. Fig. 3 is a partial side view of the lead alloy grid before the insulating and protecting means has been secured thereto. Fig. 4 is an enlarged view of the central section shown in Fig. 2.

In the drawings 10 indicates a rectangular frame portion of a lead alloy grid of the usual type employed in what are termed lead storage batteries. 11 is the usual collecting terminal. Within the rectangular frame 10 are the strip members 12 of the same material, said strips being in spaced relation with each other to form a honeycomb which is adapted to receive and support the active material indicated by the numeral 13 in Figs. 2 and 4.

The grid 10 after having been cast and machined to form substantially parallel faces is then provided with an insulating cover which is preferably secured to said grid by being formed upon the same and then vulcanized thereto.

The insulating cover comprises a substantially rectangular inclosing frame 14, which is channel-shaped in cross section, see Fig. 2, and surrounds upon the three outer exposed sides a substantially regular grid frame 10 to protect the same from action of the electrolyte, which prevents local action. A plurality of strips 15 extend across the rectangular insulating cover 14 and are in spaced relation with each other, as shown clearly in Fig. 1, to form openings by which the active material will be exposed to the action of the electrolyte and the electric current generated will also pass through the active material.

In the present instance the interstices 16 of the grid plate are smaller than the openings 17 in the cover plate. As shown in Fig. 1, every fourth strip 12 is substantially covered by the adjacent insulating strip 15 on each side, this construction being shown most clearly in Fig. 4. Since the rubber insulating strips 15 are formed upon and vulcanized to the honeycomb forming strips 12, the resultant battery plate or grid will be of rigid construction and more stable than those heretofore used.

As shown clearly in Fig. 4, the active material 13 not only fills the interstices comprising the honeycomb center of the lead alloy grid, but also fills the openings 17 of the insulating cover. With this construction only the insulating cover and the active material are exposed to the electrolyte. Since the lead alloy framework is thus insulated from the electrolyte by being covered by the insulating cover, or by being covered by the active material, local action due to the electrolyte being in direct contact with said lead alloy frame is entirely eliminated. When the grid is protected, as shown, the charge which passes from one plate to the other of the battery through the electrolyte must in all cases first pass through the active material before the same finds a conductor to complete the circuit through the plate.

While the invention has been described in detail, many modifications thereof are possible, such as changing the relative shapes of the interstices, or changing the relative positions of the alloy strips and the insulating strips, but all of these modifications and others not mentioned are considered to be within the broad purview of this invention as described in the appended claims.

The invention claimed is:

1. In a storage battery, the combination with an electrolyte, of a frame of electric conducting material adapted to be positioned within said electrolyte, active material supported by said frame, and electrolytic impervious material entirely covering all portions of the frame not covered by the active material and positioned within said electrolyte.

2. In a storage battery, the combination of an electrolyte, an inclosing frame of electric conducting material adapted to be positioned within the electrolyte, a plurality of spaced parallel reinforcing strips included within said frame, active material supported within said parallel strips, electrolytic impervious material entirely covering said frame positioned in the electrolyte, and strips of electrolytic impervious material covering said spaced reinforcing strips to protect the same from the electrolyte.

3. In a storage battery, the combination of an electrolyte, a frame of electric conducting material adapted to be positioned within the electrolyte, a plurality of spaced parallel supporting threads of similar electric conducting material, electrolytic impervious material covering said frame and provided with similar strips parallel to said conducting strips and in spaced relation therewith such that one or more of said parallel conducting strips remains uncovered, and active material supported within said spaced conducting strips and said covering strips and covering the uncovered conducting strips not covered by the electrolytic impervious material.

In witness whereof I have hereunto affixed my signature.

MALCOM O. SMITH.